(12) United States Patent
Kudo

(10) Patent No.: US 7,358,847 B2
(45) Date of Patent: Apr. 15, 2008

(54) IC TAG

(75) Inventor: Tomotaka Kudo, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 9 days.

(21) Appl. No.: 10/867,779

(22) Filed: Jun. 16, 2004

(65) Prior Publication Data

US 2005/0156707 A1 Jul. 21, 2005

(30) Foreign Application Priority Data

Jan. 16, 2004 (JP) .............................. 2004-008750

(51) Int. Cl.
*G05B 19/00* (2006.01)
*G06F 7/04* (2006.01)
*H04K 1/00* (2006.01)

(52) U.S. Cl. .................. 340/5.91; 340/5.9; 340/572.1; 705/50

(58) Field of Classification Search ............... 340/5.91, 340/572.1, 5.8, 5.9; 235/383; 705/14, 20, 705/50

See application file for complete search history.

(56) References Cited

U.S. PATENT DOCUMENTS

| | | | | |
|---|---|---|---|---|
| 5,802,015 | A * | 9/1998 | Rothschild et al. ............ | 368/10 |
| 6,390,364 | B1 * | 5/2002 | Matsushita ................... | 235/383 |
| 6,427,138 | B1 * | 7/2002 | Witt ............................. | 705/20 |
| 6,557,760 | B2 * | 5/2003 | Goodwin, III .............. | 235/383 |
| 6,753,830 | B2 * | 6/2004 | Gelbman ...................... | 345/55 |
| 6,876,975 | B1 * | 4/2005 | Zimmerman et al. .......... | 705/20 |
| 6,886,745 | B2 * | 5/2005 | Berrube et al. .............. | 235/383 |
| 6,886,746 | B1 * | 5/2005 | Edwards ...................... | 235/383 |
| 7,046,540 | B2 * | 5/2006 | Oikawa ........................ | 365/145 |
| 7,057,495 | B2 * | 6/2006 | Debord et al. ......... | 340/309.16 |
| 2002/0147649 | A1 * | 10/2002 | White .......................... | 705/20 |
| 2003/0222139 | A1 * | 12/2003 | Stephenson et al. ........ | 235/383 |
| 2004/0054634 | A1 * | 3/2004 | Tak ............................. | 705/400 |
| 2004/0073491 | A1 * | 4/2004 | Suh .............................. | 705/26 |
| 2004/0124988 | A1 * | 7/2004 | Leonard et al. ............. | 340/612 |
| 2004/0148117 | A1 * | 7/2004 | Kirshenbaum et al. ........ | 702/82 |
| 2004/0155106 | A1 * | 8/2004 | Schmidtberg et al. ...... | 235/383 |
| 2005/0134461 | A1 * | 6/2005 | Gelbman et al. ......... | 340/572.8 |
| 2005/0289061 | A1 * | 12/2005 | Kulakowski et al. ......... | 705/50 |

(Continued)

FOREIGN PATENT DOCUMENTS

CN 131429 A * 8/2001

(Continued)

OTHER PUBLICATIONS

WO 03/065317 A2: IP and Innovation Company Holding Limited, System and Method of Authenticating a Transaction, Aug. 7, 2003.*

*Primary Examiner*—Jeffery Hofsass
*Assistant Examiner*—Anne V. Lai
(74) *Attorney, Agent, or Firm*—Kratz, Quintos & Hanson, LLP

(57) ABSTRACT

An integrated circuit tag includes an item information storage unit that stores item information related to the item, an item information controller that provides control to change the item information, and an item information display unit that displays the item information stored, wherein if the item information controller provides control to change the item information stored based on an instruction wirelessly transmitted from a control device, then the item information display unit displays the item information changed.

13 Claims, 7 Drawing Sheets

U.S. PATENT DOCUMENTS

2006/0106719 A1* 5/2006 McDonnell et al. .......... 705/50

FOREIGN PATENT DOCUMENTS

| JP | 8-202768 | 8/1996 |
| JP | 11-133860 | 5/1999 |
| JP | 2002-83369 | 3/2002 |
| JP | 2002-133519 | 5/2002 |
| JP | 2002-140769 | 5/2002 |

* cited by examiner

IC TAG

BACKGROUND OF THE INVENTION

1) Field of the Invention

The present invention relates to displaying of information by an integrated circuit (IC) tag that is attached to merchandise.

2) Description of the Related Art

Items of merchandise (hereinafter, "items") sold in supermarkets and department stores are put on display with price tags and bar codes attached, to indicate the price of the item. For a special discount sale conducted over a limited period, some items are sold at a reduced price. Such items include items for which "Best Before" dates, which indicate that the quality of the item is best until the date mentioned, are near. Therefore, sales persons attach discount price tags to such items, to indicate the discount price.

However, attaching discount price tags to items increases the workload of sales persons. Sales persons must put in additional time and effort to determine items that are to be sold at discounted price or items of which Best Before dates are near, and attach the discount price tags to such items. Moreover, the sales persons may forget to attach the discount price tags to some items.

Furthermore, for each of those items, the sales person has to read item information from a bar code using a scanner at a point of sales (POS) register and enter a discount price in the POS register based on the discount price tag.

Japanese Patent Application Laid Open No. 2002-133519 discloses a price tag that includes an item data memory, which data is read from and written in using a weak current. Price data or the like is written in the item data memory with an indicator current from an antenna installed in a store, which eliminates the need for changing prices of items.

However, in the conventional price tags, if an item price is changed, a customer cannot view the updated item price. Therefore, if the information about an item is changed using an indicator current, the updated item information must be displayed on the price tag attached to the item.

Furthermore, the item information stored in the price tag may easily be read by a third person. Therefore, the privacy of customers who purchase items needs to be protected.

SUMMARY OF THE INVENTION

It is an object of the invention to at least solve the problems in the conventional technology.

An integrated circuit tag, which is attached to an item of merchandise, according to one aspect of the present invention, includes an item information storage unit that stores item information related to the item; an item information controller that provides control to change the item information; and an item information display unit that displays the item information stored, wherein if the item information controller provides control to change the item information stored based on an instruction wirelessly transmitted from a control device, then the item information display unit displays the item information changed.

An integrated circuit tag, which is attached to an item of merchandise, according to another aspect of the present invention includes an item information storage unit that stores item information including a Best Before date of the item, the item information being wirelessly transmitted from a control device; an expiration detector that detects, whether the Best Before date of the item has expired, using a timer; and an item information display processor that displays the item information stored, wherein if the expiration detector detects that the Best Before date has expired, the item information display processor displays a message to that effect.

An integrated circuit tag, which is attached to an item of merchandise, according to one aspect of the present invention includes an item information storage unit that stores item information including a Best Before date of the item, the item information being wirelessly transmitted from a control device; an expiration determining unit that determines whether the Best Before date of the item has expired, based on a present time acquired periodically from the control device and; and an item information display unit that displays a message if the expiration determining unit determines that the Best Before date has expired.

The other objects, features, and advantages of the present invention are specifically set forth in or will become apparent from the following detailed description of the invention when read in conjunction with the accompanying drawings.

DETAILED DESCRIPTION

Exemplary embodiments of an IC tag according to the present invention are explained in detail below with reference to the accompanying drawings.

Figure 1:
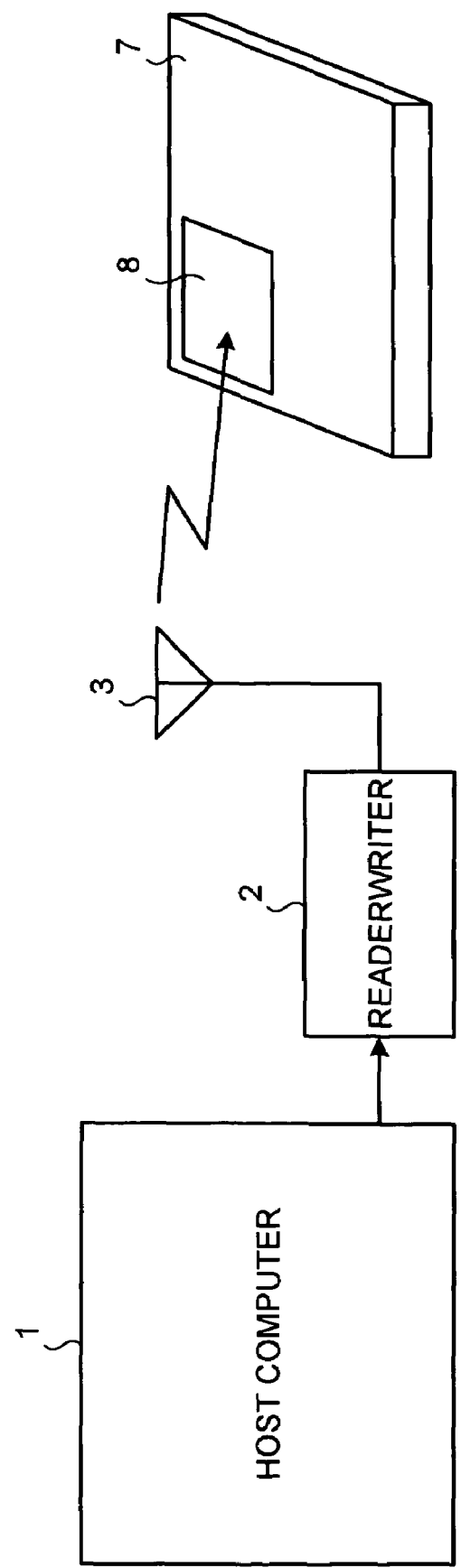
FIG. 1 is a diagram of an IC tag system according to a first embodiment of the present invention.
Figure 2:
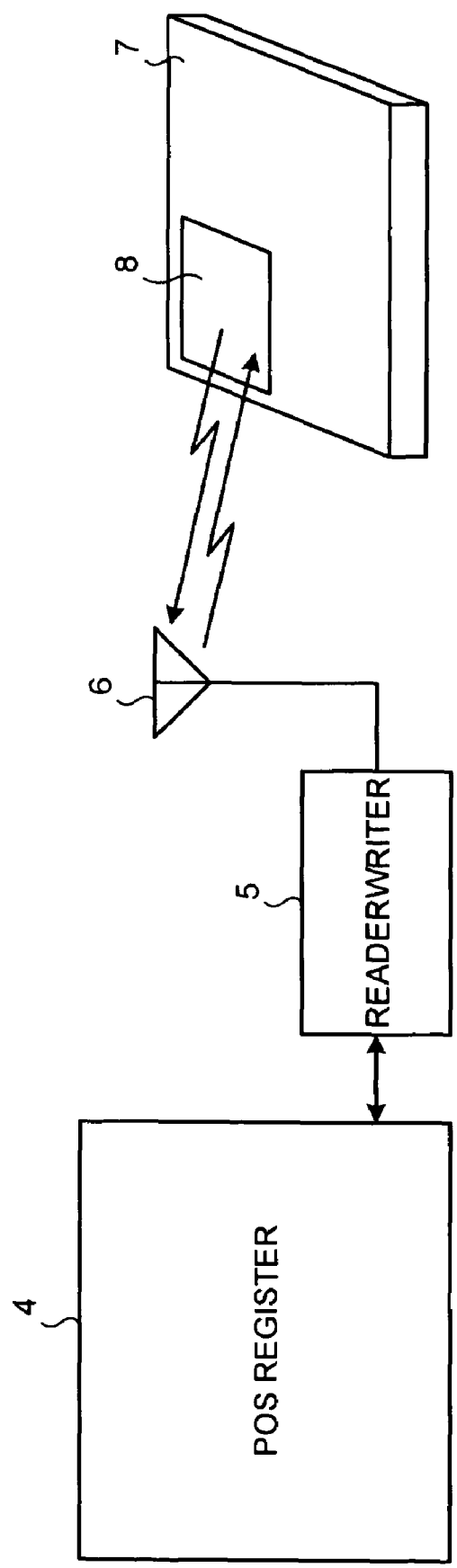
FIG. 2 is a diagram of another IC tag system according to the first embodiment.

FIG. 1 and FIG. 2 are diagrams of an IC tag system according to a first embodiment of the present invention. An antenna 3 is connected to a readerwriter 2, and the readerwriter 2 is connected to a host computer 1.

The host computer 1 transmits information about an item 7 to the readerwriter 2. The readerwriter 2 transmits the information using radio waves through the antenna 3 and writes the information in an IC tag 8 attached to the item 7.

An LCD (not shown) attached to the IC tag 8 displays the item information written by the readerwriter 2. For example, when a sales person enters a discount price of the item 7 in the IC tag 8 using the host computer 1, the LCD displays the discount price. Thus, a customer can obtain updated information about the item 7. Moreover, the sales person need not attach discount price tags to items. Consequently, the burden on the sales person reduces.

In the IC tag system shown in FIG. 2, an antenna 6 is connected to a readerwriter 5, and the readerwriter 5 is connected to a POS register 4. The POS register 4 acquires item information about the item 7 from the IC tag 8 and displays an item price of the item 7 based on the item information acquired. The POS register 4 transmits encrypted data to the IC tag 8, if required, to rewrite the item information with the encrypted data.

The readerwriter 5 is used when the POS register 4 acquires item information about the item 7 from the IC tag 8 and when the POS register writes encrypted data in the IC tag 8 using radio waves transmitted through the antenna 6. The readerwriter 5 transmits radio waves to the IC tag 8 through the antenna 6 to read the item information stored in the IC tag 8, and then transmits the item information read to the POS register 4.

Similarly, when encrypted data is to be written in the IC tag 8, the readerwriter 5 transmits radio waves including the encrypted data received from the POS register 4 to the IC tag 8 through the antenna 6 to rewrite the item information written in the IC tag 8 with the encrypted data.

Therefore, the sales person need not enter the discount information in the POS register 4 based on the discount price tag attached to the item, unlike the conventional manner. In other words, it is possible to omit entering the discount information in the POS register 4 and to read simultaneously a plurality of pieces of data transmitted from the IC tag. Therefore, the sales person does not need to register items that are sold, one after another.

Furthermore, because the item information written in the IC tag 8 is rewritten with the encrypted data as required, the privacy of the customer that purchases the item can be protected by preventing a third person from reading from the IC tag 8, the item information of an item purchased.

Figure 3:
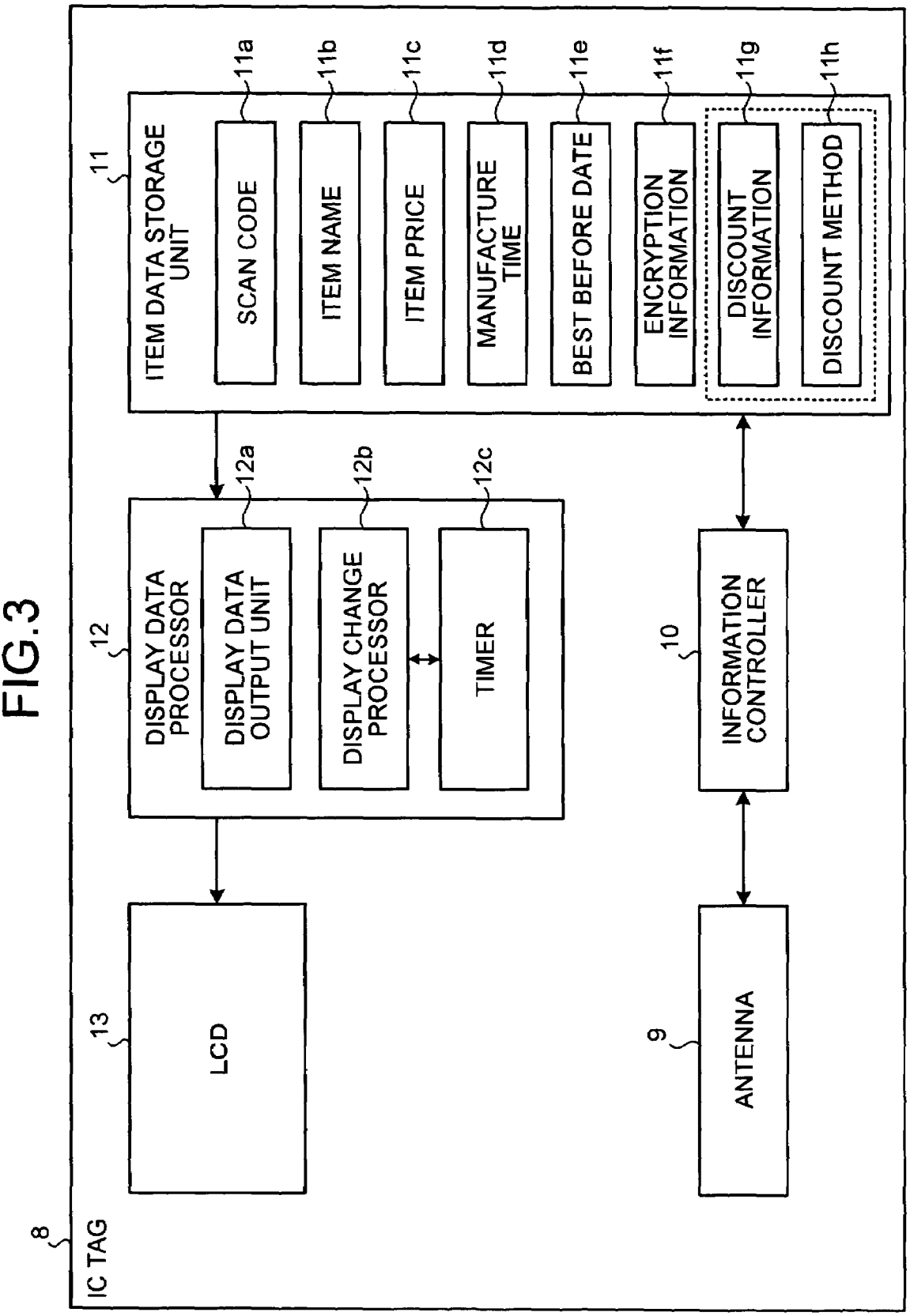
FIG. 3 is a functional block diagram of the IC tag.

FIG. 3 is a functional block diagram of the IC tag 8. The IC tag 8 includes an antenna 9, an information controller 10, an item data storage unit 11, a display data processor 12, and an LCD 13.

The antenna 9 receives radio waves from the readerwriter 2 or 5 for writing or reading item information, and transmits the radio waves to the information controller 10. The information controller 10 stores the item information in the item data storage unit 11 based on the radio waves. On receiving radio waves from the antenna 9 for reading item information, the information controller 10 acquires the item information from the item data storage unit 11, and sends the item information acquired to the readerwriter 2 or 5 via the antenna 9.

The item data storage unit 11 includes scan code 11a, item name 11b, item price 11c, manufacture time 11d, Best Before date 11e, encryption information 11f, discount information 11g, and discount method 11h. The readerwriter 2 transmits these pieces of information.

The scan code 11a identifies an item 7, the item name 11b is the name of the item 7, the item price 11c is the price of the item 7, and the manufacture time 11d is the time when the item 7 was manufactured.

The Best Before date 11e is the Best Before date of the item 7, the encryption information 11f indicates whether data stored in the item data storage unit 11 is to be encrypted, the discount information 11g is a numerical value to be discounted from the item price, and the discount method 11h indicates how to discount the item price.

The discount information 11g and the discount method 11h are explained below in detail. For example, if the discount information 11g is "300", the discount method 11h is "yen", and the item price is "1000 yen", then the discounted item price is "700 yen", which indicates "a discount of 300 yen" for the item price 11c.

On the other hand, if the discount information 11g is "20", the discount method 11h is "percent", and the item price 11c is "1000 yen", then the discounted item price is "800 yen", which indicates "a discount of 20 percent" for the item price 11c.

The display data processor 12 sends data stored in the item data storage unit 11 to be displayed on the LCD 13. The display data processor 12 includes a display data output unit 12a, a display change processor 12b, and a timer 12c.

The display data output unit 12a acquires the item price 11c, the manufacture time 11d, the Best Before date 11e, the discount information 11g, and the discount method 11h from the item data storage unit 11, and sends the data to the LCD 13 for display.

When it is determined, using the timer 12c, that the Best Before date 11e of an item has expired, the display change processor 12b issues an instruction to change a color of the item information currently displayed on the LCD 13. For example, if the Best Before date 11e expires, the color of the item information displayed on the LCD 13 is changed from black to red.

Thus, customers can recognize, at a glance, items of which Best Before dates expire. Therefore, the customers avoid buying such items. Similarly, the sales persons can easily recognize the items of which the Best Before dates have passed, and the burden on the sales persons, of disposing of the items, reduces.

The LCD 13 displays the item price 11c, the manufacture time 11d, the Best Before date 11e, the discount information 11g, and the discount method 11h, which are input from the display data output unit 12a. Further, the LCD 13 changes the color of the item information displayed based on an instruction from the display change processor 12b.

In the first embodiment, the scan code 11a, the item name 11b, the item price 11c, the manufacture time 11d, the Best Before date 11e, and the encryption information 11f are previously written in the item data storage unit 11.

When the readerwriter 2 writes the discount information 11g and the discount method 11h in the item data storage unit 11, the display data output unit 12a acquires the discount information 11g and the discount method 11h, to display on the LCD 13.

Thus, in addition to the item name 11b, the item price 11c, the manufacture time 11d, and the Best Before date 11e, the LCD 13 displays the discount information 11g and the discount method 11h.

Figure 4:
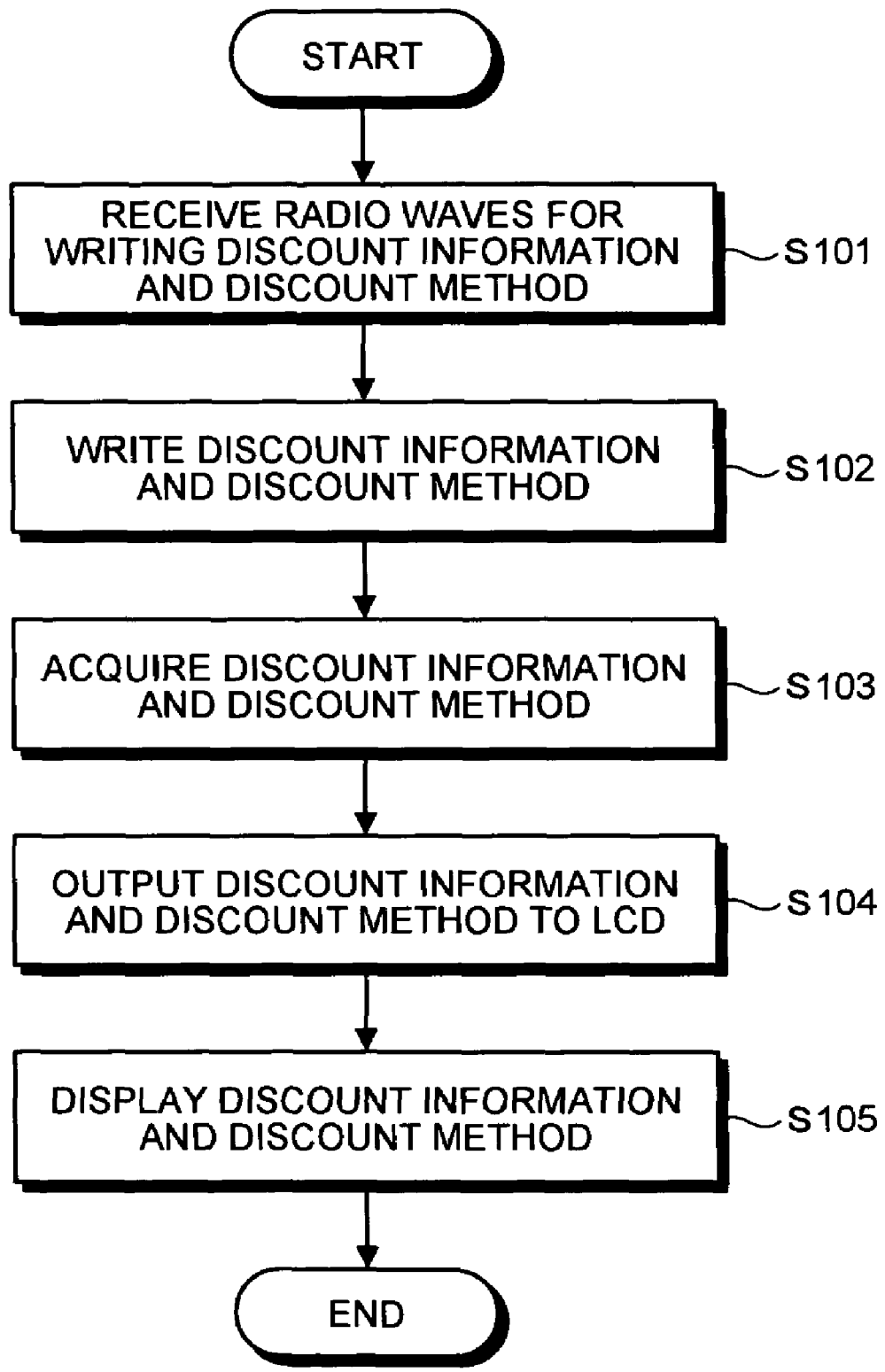
FIG. 4 is a flowchart of a process of writing discount information and discount method in the IC tag, and of displaying the discount information and the discount method on a liquid crystal display (LCD)

FIG. 4 is a flowchart of a process of writing the discount information and the discount method in the IC tag, and of displaying the discount information and the discount method on the LCD.

The antenna 9 receives radio waves from the readerwriter 2 for writing the discount information 11g and the discount method 11h (step S101), and the information controller writes the discount information 11g and the discount method 11h in the item data storage unit 11 (step S102).

The display data output unit 12a acquires the discount information 11g and the discount method 11h written (step S103), to output to the LCD 13 (step S104). The LCD 13 displays the discount information 11g and the discount method 11h input in addition to the information already displayed (step S105).

Figure 5:
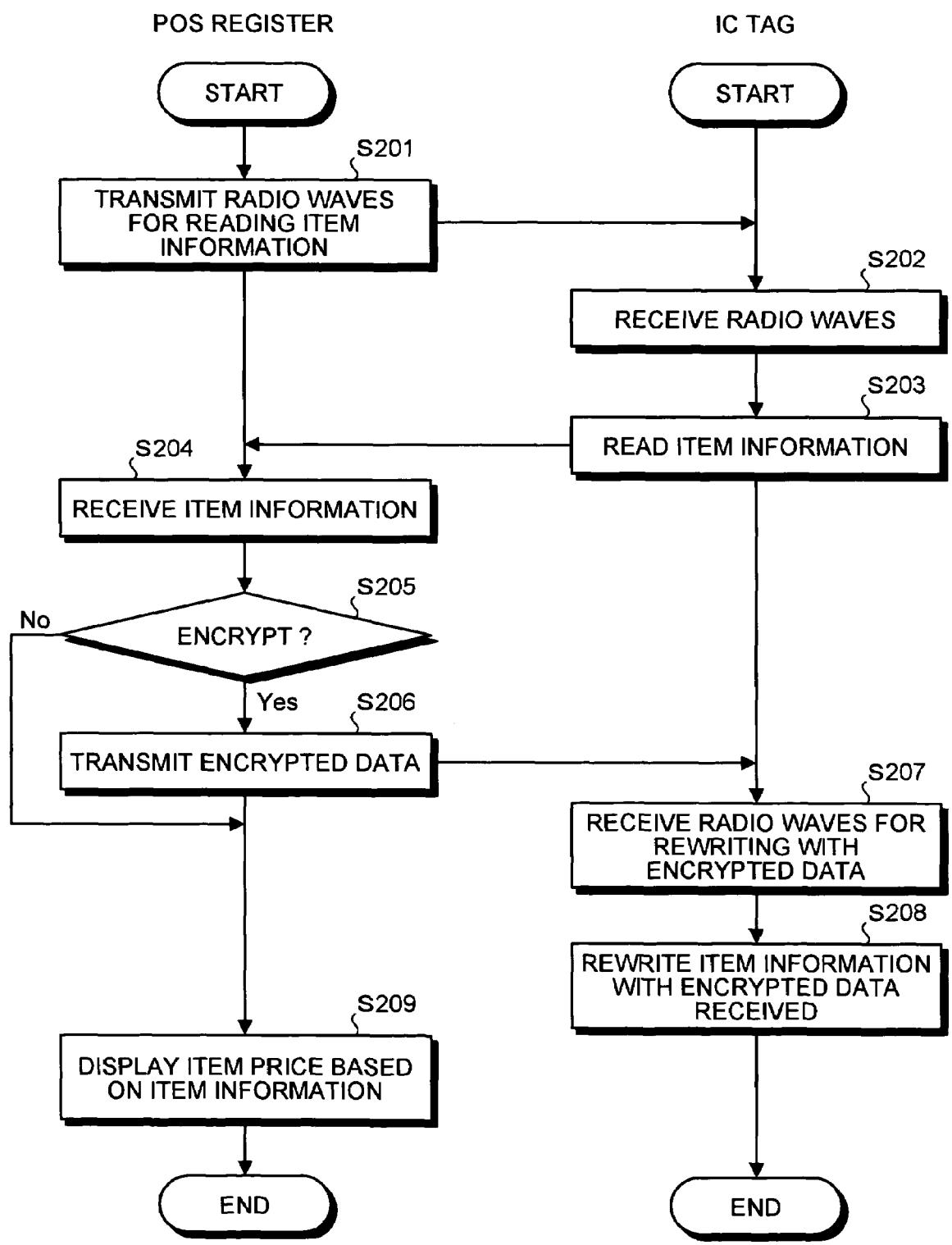
FIG. 5 is a flowchart of a process in which the POS register acquires item information from the IC tag and displays a price of an item.

FIG. 5 is a flowchart of a process in which the POS register acquires item information from the IC tag and displays the price of an item.

The POS register 4 transmits radio waves for reading the item information about the item 7 to the IC tag 8 through the readerwriter 5 and the antenna 6 (step S201). The IC tag 8 receives the radio waves from the readerwriter 5 (step S202), and causes the readerwriter 5 to read, as item information, the scan code 11a, the item name 11b, the item price 11c, the manufacture time 11d, the Best Before date 11e, the encryption information 11f, the discount information 11g, and the discount method 11h, which are stored in the item data storage unit 11 (step S203).

The POS register 4 receives the item information through the readerwriter 5 (step S204), and determines whether the item information should be encrypted, based on the encryption information 11f included in the item information received (step S205).

If the encryption information 11f indicates that encryption is not needed (No at step S205), the POS register 4 displays the item price based on the item information read (step S209). On the other hand, if the encryption information 11f indicates that encryption is needed (Yes at step S205), the POS register 4 transmits encrypted data to the IC tag 8 through the readerwriter 5 (step S206), and the process in the POS register 4 proceeds to step S209.

The IC tag 8 receives the radio waves for rewriting the item information with the encrypted data (step S207), where the item information stored in the item data storage unit 11 is rewritten with the encrypted data received (step S208).

As explained above, in the IC tag 8 according to the first embodiment, the display data output unit 12a acquires the discount information 11g and the discount method 11h written by the readerwriter 2, and displays the information acquired on the LCD 13. Therefore, the sales persons need not attach the discount price tags to the items.

The POS register 4 acquires the item information including the discount information 11g and the discount method 11h from the IC tag 8 through the readerwriter 5 for displaying on the LCD. Therefore, the sales persons do not need to enter the discount prices into the POS register 4 separately.

The display change processor 12b changes the color of the item information displayed on the LCD 13 if the Best Before date 11e expires. Therefore, the customers and the sales persons can easily distinguish items of which Best Before dates have passed.

The item information included in the IC tag 8 is rewritten with the encrypted data whenever necessary, which makes it possible to protect privacy of customers and prevent tampering of the item information.

According to the first embodiment, the scan code 11a, the item name 11b, the item price 11c, the manufacture time 11d, the Best Before date 11e, and the encryption information 11f are written in the item data storage unit 11, and the discount information 11g and the discount method 11h are written by the readerwriter 2 later, when required. However, the process is not limited thereto. For example, the item price 11c may be rewritten in the item data storage unit 11, and then displayed on the LCD 13.

According to the first embodiment, the readerwriter writes and reads the item information transmitted from the host computer 1 in one IC tag 8. However, the readerwriter may write and read item information in a plurality of IC tags using radio waves.

Whether encryption is required and an encryption method may be included in the encryption information 11f, and the POS register 4 may encrypt the item information included in the IC tag 8 based on the encryption method specified.

According to the first embodiment, the timer 12c is used to determine whether the Best Before date 11e has expired. However, a current time may be acquired periodically from the host computer 1 to determine whether the Best Before date 11e has expired.

In other words, the display change processor 12b may compare the current time acquired with the Best Before date 11e. If the current time has passed the Best Before date 11e, the display change processor 12b may issue an instruction to change a color of item information displayed on the LCD 13.

According to the first embodiment, the IC tag displays the item information on the LCD, thereby reducing the burden on the sales persons. However, the IC tag may calculate an item price from item information, and then display the item price calculated on the LCD. Thus, convenience further increases.

In a second embodiment of the present invention, a case where an IC tag calculates an item price from item information written therein and displays the item price calculated is explained.

Figure 6:
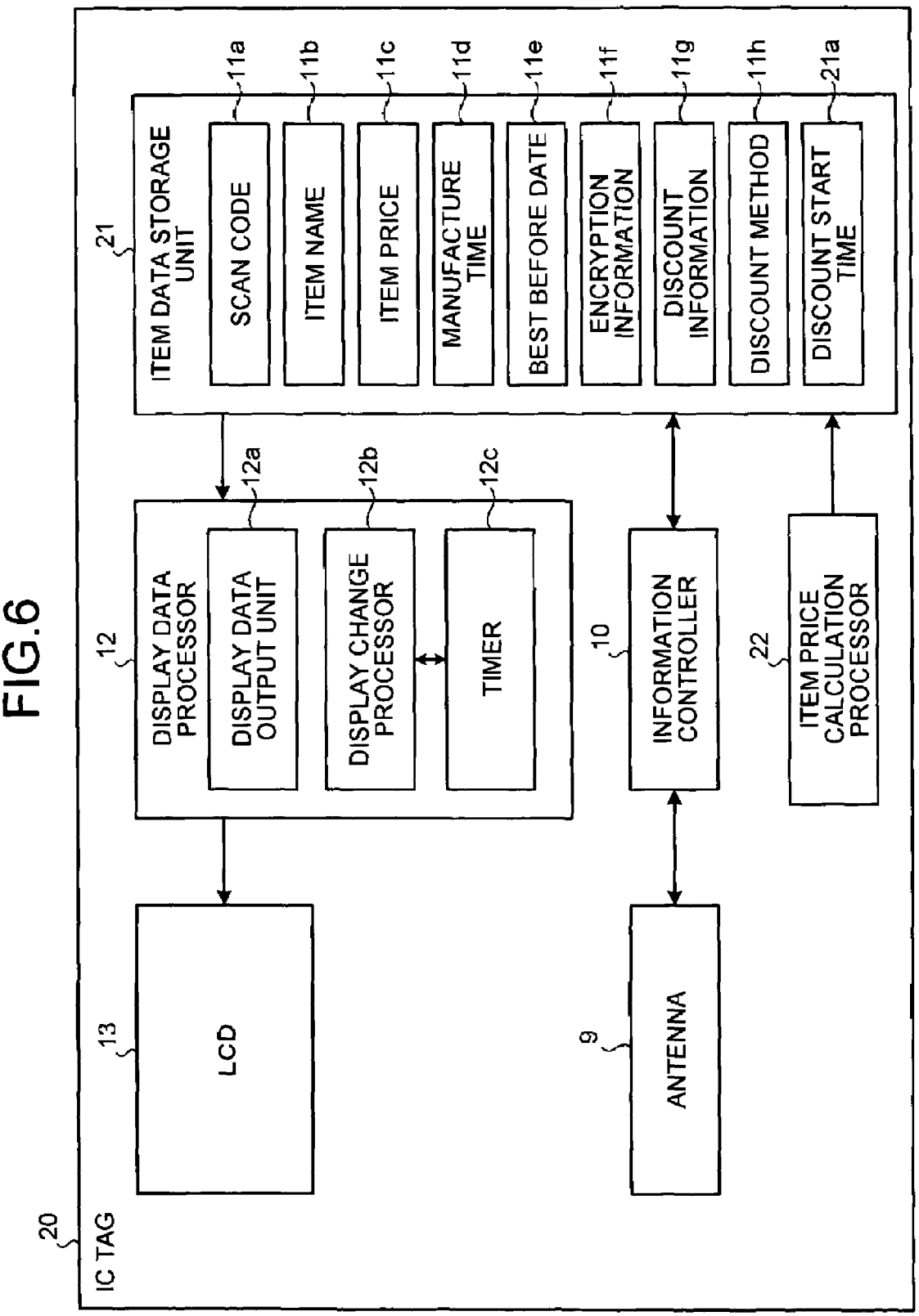
FIG. 6 is a functional block diagram of an IC tag according to a second embodiment.

FIG. 6 is a functional block diagram of an IC tag 20 according to the second embodiment. The IC tag 20 includes an item data storage unit 21 and an item price calculation processor 22. The other components and the operation are the same as those in the IC tag 8 with reference to the first embodiment.

The item data storage unit 21 includes the scan code 11a, the item name 11b, the item price 11c, the manufacture time 11d, the Best Before date 11e, the encryption information 11f, the discount information 11g, the discount method 11h, and discount start time 21a. The discount start time 21a indicates a time to start discounting. In the second embodiment, these pieces of information are previously written in the item data storage unit 21 by the readerwriter 2.

If the discount start time 21a has passed, the item price calculation processor 22 corrects the item price 11c based on the discount information 11g and the discount method 11h.

Figure 7:
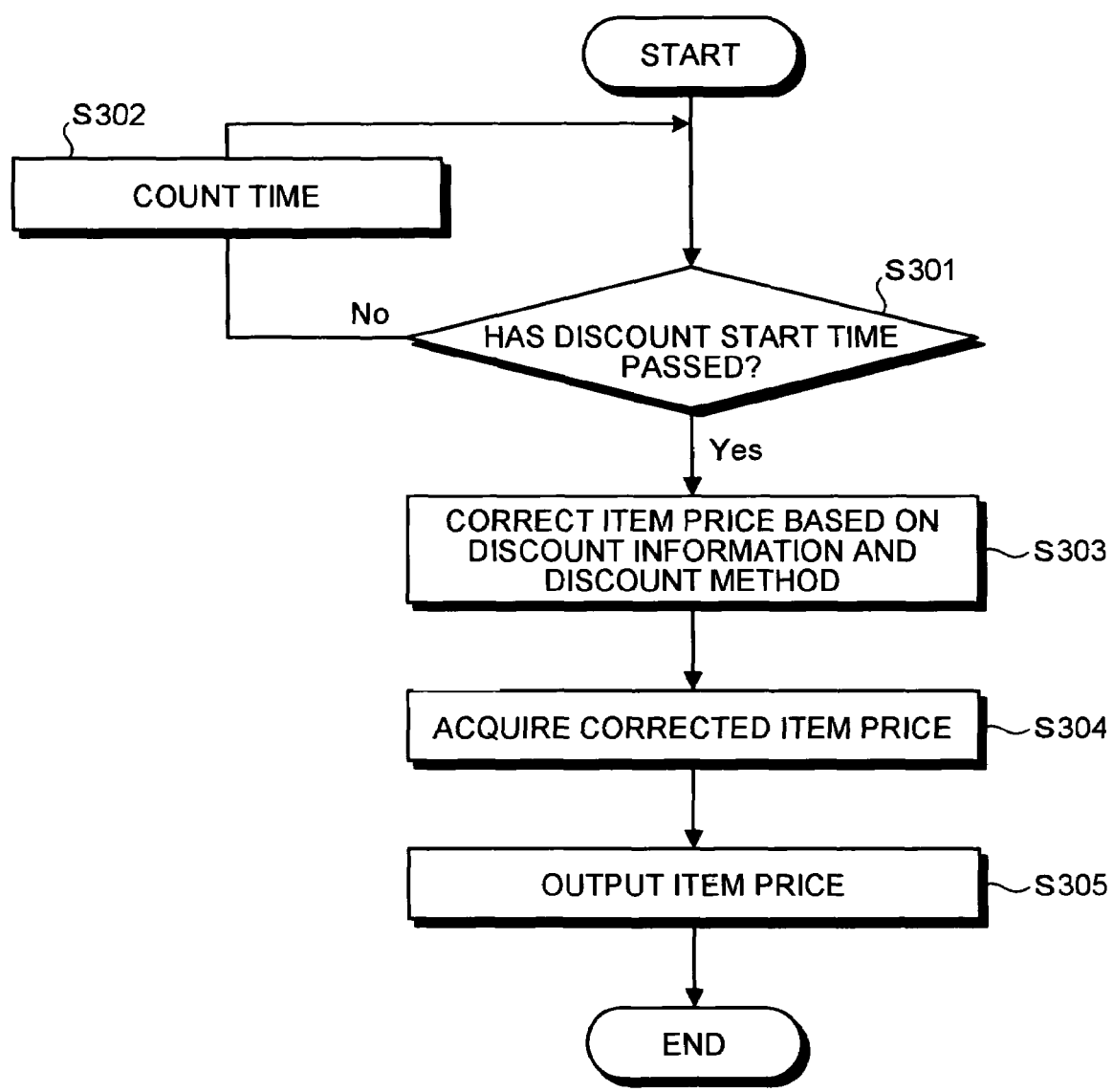
FIG. 7 is a flowchart of a process executed by an item price calculation processor.

FIG. 7 is a flowchart of a process executed by the item price calculation processor.

As shown in FIG. 7, the item price calculation processor 22 determines whether the discount start time 21a has passed (step S301). If the discount start time 21a has not passed (No at step S301), the step S301 is repeated after a predetermined time passes (step S302).

However, if the discount start time 21a has passed (Yes at step S301), the item price calculation processor 22 corrects the item price 11c based on the discount information 11g and the discount method 11h (step S303).

The display data output unit 12a acquires the item price 11c corrected (step S304), and outputs the item price 11c acquired to the LCD 13 (step S305).

As explained above, in the IC tag 20 according to the second embodiment, the item price calculation processor 22 monitors the discount start time 21a, and corrects the item price 11c based on the discount information 11g and the discount method 11h if the discount start time 21a has passed. The display data output unit 12a causes the LCD 13 to display the item price 11c corrected.

Therefore, the IC tag 20 allows a price of an item to be displayed clearly. Furthermore, because the item price calculation processor 22 corrects the item price 11c, the POS register 4 need not calculate the item price 11c based on the discount information 11g and the discount method 11h, thereby reducing the number of tasks to be performed.

In the first and the second embodiments, the item information is written in and read from the item data storage unit 11 (21) through the information controller 10. However, the item information may be directly written in and read from the item data storage unit 11 (21) using the readerwriter 2 (5).

According to one aspect of the present invention, sales persons and customers can easily recognize the information about items stored in the IC tags.

According to another aspect of the present invention, sales persons and customers can easily distinguish items whose Best Before dates have passed.

According to still another aspect of the present invention, sales persons need not attach discount price tags to the items, or enter the discount prices in the POS register.

Furthermore, customers can distinguish the items whose Best Before date has passed, and hence, avoid purchasing such items. Therefore, sales persons are saved the additional work of disposing of the items of which Best Before dates have passed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An integrated circuit tag that is attached to an item of merchandise, comprising:
    an item information storage unit that stores item information, wherein the item information includes an item price, a first discount information, a discount start time indicating a time to start discounting, and encryption information that indicates whether the item information is to be encrypted;
    an item information controller that provides control to change the item information;
    an item price calculation processor that corrects the item price based on the first discount information if the discount start time has passed; and
    an item information display unit that displays the item information stored, wherein
    if the item information controller provides control to change the item information stored based on an instruction wirelessly transmitted from a control device or the item price calculation processor corrects the item price, then the item information display unit displays the item information changed or corrected, and
    the item information controller is further configured to encrypt the item information at a time when the item is sold, based on an instruction from the control device if the encryption information indicates that the item information is to be encrypted.

2. The integrated circuit tag according to claim 1, further comprising:
    a discount information updating unit that updates the first discount information.

3. The integrated circuit tag according to claim 1, wherein the item information further includes a Best Before date of the item, and
    the integrated circuit tag further comprises:
        an expiration detector that detects whether or not the Best Before date of the item has expired, using a timer, wherein if the expiration detector detects that the Best Before date has expired, the item information display unit displays a message that the Best Before date has expired; and
        a display color changing unit that changes a color of an expiration information displayed if the Best Before date has expired, wherein the expiration information includes the Best Before date being displayed or the message.

4. The integrated circuit tag according to claim 1, wherein the item information includes a Best Before date of the item; and
    the integrated circuit tag further comprises:
        an expiration determining unit that determines whether the Best Before date of the item has expired, based on a present time acquired periodically from a control device;
        the item information display unit displays a message if the expiration determining unit determines that the Best Before date has expired; and
        a display color changing unit that changes a color of an expiration information displayed, if the Best Before date has expired, wherein the expiration information includes the Best Before date being displayed or the message.

5. The integrated circuit tag according to claim 1, wherein the first discount information includes:
    a second discount information that indicates a numeral; and
    a discount method that indicates a method of discounting using the numeral.

6. The integrated circuit tag according to claim 1, wherein the item price calculation processor monitors the discount start time and determines if the discount start time has passed.

7. The integrated circuit tag according to claim 1, wherein the item information further includes a Best Before date of the item; and
    the item information display unit displays the Best Before date.

8. The integrated circuit tag according to claim 7, further comprising a display color changing unit that changes a color of the Best Before date being displayed, if the Best Before date has expired.

9. The integrated circuit tag according to claim 8, further comprising an expiration detector that detects whether the Best Before date of the item has expired, using a timer or based on a present time acquired periodically from the control device.

10. The integrated circuit tag according to claim 7, wherein the item information display unit displays a message indicating that the Best Before date has expired, if the Best Before date has expired.

11. The integrated circuit tag according to claim 10, further comprising a display color changing unit that changes a color of the message, if the Best Before date has expired.

12. The integrated circuit tag according to claim 10, further comprising an expiration detector that detects whether the Best Before date of the item has expired, using a timer or based on a present time acquired periodically from the control device.

13. The integrated circuit tag according to claim 1, wherein the first discount information is an amount to be discounted, and the item price calculation processor corrects the item price by subtracting the amount to be discounted from the item price.

* * * * *